United States Patent Office 3,582,420

Patented June 1, 1971

3,582,420

FIBER REINFORCED ELASTOMERIC PRODUCTS AND INTERMEDIATE

Alfred Marzocchi, Cumberland, and Frank J. Lachut, Pawtucket, R.I., assignors to Owens-Corning Fiberglas Corporation No Drawing. Filed Oct. 21, 1968, Ser. No. 769,381
Int. Cl. B32c 5/00
U.S. Cl. 156—179 13 Claims

ABSTRACT OF THE DISCLOSURE

The improvement in the bonding relationship between plies of elastomeric material and reinforcing fibers whereby the reactivity of the surfaces of the elastomeric material is enhanced to achieve a stronger interbonded relationship between the components by uniform distribution of short lengths of glass fibers in the elastomeric component in an amount within the range of 2½–20% by weight.

This invention relates to fiber reinforced elastomeric products and more particularly to elastomeric products reinforced with fibers, such as synthetic resinous fibers in the form of cords of polyester fibers, polyamide fibers, rayon fibers and the like, or cords of glass fibers.

In the manufacture of tires, for example, fibrous cords of the type described are applied as interlayers or plies with the elastomeric material prior to molding and vulcanization or cure to integrate the reinforcing fibrous cords into the body of elastomeric material for reinforcement. To the present, the majority of rubber tires that are manufactured in this country are fabricated with the reinforcing fibrous cords introduced as plies in which the cords extend on a bias with the circumference of the tire. In most of the tires manufactured on the continent, the cords are plied in a radial direction to produce a longer wearing but harder riding radial tire.

The effectiveness of the fiber reinforcement in the elastomeric system depends greatly on the influence of the fibrous component on the interbonded relationship between the adjacent layers of the elastomeric material and between the fibrous reinforcement and the adjacent layers of elastomeric material. A strong and permanent interbonded relationship between the rubber plies and between the plies of fiber reinforcement and the adjacent plies of rubber is most desirable for production of an elastomeric product of high strength and for fullest utilization of the fiber reinforcement.

It is an object of this invention to produce and to provide a method for producing fiber reinforced elastomeric products of high strength in which a strong and permanent bonded relationship is developed between the plies of elastomeric material during molding to the desired elastomeric product and between the plies of elastomeric material and the interply of fiber reinforcement and it is a related object to provide a new and improved intermediate product of elastomeric material for use in the manufacture of same.

The invention will hereinafter be described with reference to the combination of elastomeric materials and fibrous reinforcement in the form of cords of polyester resinous fibers. It will be understood that the same concepts have application to various of the elastomeric polymers and copolymers used in the manufacture of elastomeric products, such as belts, tires and the like and to various of the other fibrous reinforcements, such as fibers of nylon, rayon, glass fibers and cords or yarns formed thereof.

It has been found that when a ply of cords, such as are formed of polyester resinous fibers, is sandwiched between plies of elastomeric material and molded under heat and pressure for integration into a composite cured product, the interbonded relationship between the plies is markedly increased when the plies of elastomeric material positioned adjacent the fibrous reinforcement are formulated to contain short lengths of glass fibers uniformly distributed throughout the elastomeric material, especially, though not essentially, when the short lengths of glass fibers have a surface coating, such as in the form of a size coating containing an anchoring agent or an assimilating agent, such as an organo silicon compound containing an amino, epoxy or carboxyl group, as described in the issued Pat. No. 3,252,278, entitled "Elastomeric—Glass Fiber Products and Process and Elements for Use in Same," or a Werner complex compound containing an amino, epoxy or carboxyl group in the carboxylato group coordinated with the nuclear chromium atom, as described in the issued Pat. No. 3,402,064, entitled "Glass Fiber Reinforced Elastomers and Composition for Sizing and Impregnating Such Glass Fiber Systems," or a resorcinol formaldehyde-rubber latex system, as described in the Canadian Pat. No. 435,754, entitled "Latex Composition and Process for Making Same."

The phenomenon that gives rise to the improvement that is secured when the elastomeric system is formulated with glass fibers distributed therein in the manner described is not presently fully understood. There is reason to believe that the polymeric or copolymeric elastomeric composition contains lower molecular weight or fluid components, such as compounding oils or plasticizers, which tend to migrate to the surface of the ply. These components, which appear to be oily or greasy in nature, interfere with the reactivity of the surface and the ability to establish a strong and permanent bonded relationship between the materials making up the adjacent surface portions of the elastomeric system and the fibrous reinforcing elements with the result that the composite structure has certain weaknesses and non-uniformities. When the glass fiber component is present in substantially uniform distribution throughout the elastomeric system, it appears that migration of the interfering substances does not occur, at least to the extent experienced in the absence of the glass fiber component. As a result, the surface retains its reactivity and is capable of establishing an interbonded relationship of greater permanence and strength.

There is reason to believe that the material or materials present in the size or coating on the glass fiber surfaces, as previously described, may be capable of reaction with components of the elastomeric system whereby the undesirable interference with surface reactivity is substantially overcome.

Whatever the reason, it has been found that a more receptive surface is retained when the glass fiber component is present in uniform distribution throughout the elastomeric material and that the adhesive character of the elastomeric system is thereby greatly improved. By way of illustration, as much as a two-fold increase in bonding strength is experienced between cords of polyester resinous fibers sandwiched between slabs of elastomeric material and molded when 6–10% by weight of chopped glass fibers are present in uniform distribution through the elastomeric material by comparison with the same materials molded under the same conditions in the absence of such glass fiber component.

The described improvement is secured when the short lengths of cut or chopped glass fibers are present in the elastomeric material in an amount of at least 2–5% by weight of the elastomeric system but it is preferred to make use of an elastomeric system in which the glass fiber component is present in an amount within the range of 5–10% by weight. Amounts of glass fibers greater than 10% by weight of the elastomeric system can be used but it is difficult to incorporate more than 30% by weight of glass fibers and it is preferred to limit the amount of glass fiber component to not more than about 20% by weight.

As the glass fiber component, use can be made of discontinuous or staple glass fibers or strands or yarns formed thereof or of continuous glass fibers and strands and yarns formed thereof in which the glass fibers, strands or yarns are cut or chopped to shorter lengths within the range of 1/64 to 1/2 inch and preferably within the range of 1/16 to 1/4 inch. If use is made of strands or yarns containing hundreds of individual glass fibers, it is desirable to separate the majority of the glass fibers in the strand or yarn for more uniform distribution throughout the elastomeric material. This can be accomplished best by introduction of the glass fiber component into the elastomeric material and thereafter effecting fiber separation as the elastomeric material is worked or compounded in the conventional manner for the incorporation of other ingredients such as fillers and carbon black by banburying or working between rolls.

The coatings, when present on the glass fiber surfaces, can be applied to the surfaces of the individual glass fibers in forming by the conventional methods of sizing the glass fibers as the glass fibers are formed by rapid attenuation of molten streams of glass issuing from the bottom side of a glass melting bushing and gathered together to form yarns; or by spraying the coating composition onto the surfaces of the glass fibers as the molten streams of glass are stretched by angular impingement of streams of air or steam in the staple glass fiber forming process. The amount of size or coating is not critical. It is sufficient if the minimum amount for providing a monomolecular layer on the glass fiber surfaces is present but it is undesirable to make application for a dry coating weight that exceeds 5–10% by weight of the glass fibers.

As used herein, the term "elastomeric material" is intended to include natural rubber and synthetic rubbers, such as are formed by emulsion or solvent polymerization or copolymerization of monoolefins, conjugated diolefinic or polyolefinic compounds, as represented by butadiene rubber, chloroprene rubber, butadiene-styrene rubber, nitrile rubbers, acrylate rubbers, butyl rubber, polysulphide rubbers, styrene-butadiene-acrylonitrile rubbers (SBR), EPDM rubbers, and the like.

Having described the basic concepts of this invention, illustration will now be made by way of the practice thereof with the following examples:

Fiber coating compositions:

EXAMPLE 1

| | Percent by weight |
|---|---|
| Gamma-aminopropyltriethoxysilane | 0.5–2.0 |
| Glycerine | 0.3–0.6 |

Remainder water.

EXAMPLE 2

| | Percent by weight |
|---|---|
| Glycylato chromic chloride | 0.1 |

Remainder water.

EXAMPLE 3

| | Percent by weight |
|---|---|
| Partially dextrinized starch | 8 |
| Hydrogenated vegetable oil | 1.8 |
| Lauryl amine acetate | 0.4 |
| Nonionic emulsifying agent | 0.2 |
| Gamma-aminopropyltriethoxysilane | 1.0 |

Remainder water.

EXAMPLE 4

| | Percent by weight |
|---|---|
| Natural rubber latex-resorcinol formaldehyde resin dispersed in aqueous medium to 38% solids | 15 |
| Water | 82 |
| Gamma-aminopropyltriethoxysilane | 3 |

The coating compositions of Example 1–4 are wiped onto surfaces of individual glass fibers as they are formed by rapid attenuation of molten streams of glass and gathered together to form a glass fiber bundle in the form of a yarn.

In the process of formation of staple glass fibers, the coating compositions of Examples 1–4 are applied by spraying onto the surfaces of the glass fibers as they are formed by directing high velocity streams of air or steam angularly downwardly onto the molten streams of glass issuing from the bottom side of a glass melting bushing and allowed to fall gravitationally downwardly through a collecting hood onto a foraminous belt or drum whereon they are gathered into a glass fiber bundle or yarn.

The coated glass fibers are then cut or chopped to lengths of about 1/16 to 1/4 inch and compounded into an SBR rubber (styrene-butadiene-acrylonitrile), a butyl rubber, a butadiene-rubber, a butadiene-nitrile rubber, an EPDM interpolymer or the like, in an amount within the range of 6–10% by weight. The rubber-glass fiber system together with other compounding agents such as carbon black, fillers, vulcanizing or curing agents are then banburied and milled to form slabs of compounded rubber with the glass fiber component uniformly distributed, substantially as individual fibers throughout the elastomeric system.

The slabs of elastomeric material can then be used in the conventional manner in combination with cords of polyester, nylon, rayon, glass fibers and the like in the manufacture of tires or belts, as described in the issued Pat. No. 3,334,166 entitled "Glass Fiber—Rubber Molding Compound and Method." The composite materials are molded under heat and pressure to shape the product in advance of the composite structure to the cured or vulcanized stage.

In a specific test for bonding, cords of polyester resins are laid down between slabs of elastomeric material and molded under heat and pressure whereafter the strength to separate the cords from the elastomeric material is taken as a measure of interbonding strength. When the slabs of elastomeric material are formulated in accordance with the practice of this invention to contain the glass fiber component uniformly distributed therein, the bonding strength is increased more than two-fold by comparison with the same tests performed with slabs of elastomeric material in which the glass fiber component is entirely absent.

It will be apparent from the foregoing that we have provided a new and improved means for increasing the reactivity of the surfaces of elastomeric components employed in the manufacture of fiber reinforced elastomeric products whereby elastomeric products of increased strength and integrity are capable of being secured.

It will be understood that the concepts of this invention will apply not only to the method for achieving the increased bonding relation between the elements but in the glass fiber filled elastomeric intermediate product employed in the combination with the fibrous reinforcement in the manufacture of such elastomeric products and that other changes may be made in the details of construction, arrangement and operation without departing from the spirit of the invention, especially as defined in the following claims.

We claim:

1. The method for producing elastomeric products reinforced with fibrous material comprising positioning the reinforcing fibers alongside one surface of the elastomeric material having short length of glass fibers uniformly distributed throughout at least the adjacent surfaced portion of the elastomeric material whereby the reactivity of the surface adjacent the reinforcing fibers is retained, and combining the elastomeric material and fibrous reinforcement under heat and pressure to form the material into a composite fibrous reinforced elastomeric product.

2. The method as claimed in claim 1 in which the glass fibers are uniformly distributed throughout the elastomeric material.

3. The method as claimed in claim 1 in which the glass fibers are present in an amount of at least 2½% by weight of the elastomeric product.

4. The method as claimed in claim 1 in which the glass fibers are present in an amount within the range of 2½–20% by weight of the elastomeric product.

5. The method as claimed in claim 1 in which the glass fibers are present in an amount within the range of 5–10% by weight of the elastomeric product.

6. The method as claimed in claim 1 in which the glass fibers are dimensioned to have an average length within the range of 1/64 to ½ inch.

7. The method as claimed in claim 1 in which the glass fibers are dimensioned to have an average length within the range of 1/16 to ¼ inch.

8. The method as claimed in claim 1 in which the glass fibers have a coating on the surfaces thereof.

9. The method as claimed in claim 8 in which the coating contains an organo silicon compound having a group selected from the group consisting of amino, epoxy and carboxyl groups in an organic group attached to the silicon atom.

10. The method as claimed in claim 8 in which the coating contains a Werner complex compound in which the carboxylato group coordinated with the chromium atom contains a grouping selected from the group consisting of an amino, epoxy and carboxyl group.

11. The method as claimed in claim 8 in which the coating contains a rubber latex-resorcinol formaldehyde resin.

12. The method as claimel in claim 1 in which the reinforcing fibers are in the form of cords disposed between plies of elastomeric material.

13. The method as claimed in claim 1 in which the reinforcing fibers selected from the group consisting of polyester resin, polyamide resin, rayon and glass fibers.

References Cited

UNITED STATES PATENTS 3,334,166 8/1967 Marzocchi .......... 264—136

LELAND A. SEBASTIAN, Primary Examiner

R. L. TATE, Assistant Examiner

U.S. Cl. X.R.

156—110, 178, 276, 297; 264—136, 331